US010467227B2

(12) United States Patent
Kimelfeld et al.

(10) Patent No.: US 10,467,227 B2
(45) Date of Patent: Nov. 5, 2019

(54) DOMAIN CENTRIC NATURAL LANGUAGE QUERY ANSWERING

(71) Applicant: International Business Machines Corporation, Armonk, NY (US)

(72) Inventors: Benny Kimelfeld, Haifa (IL); Yunyao Li, San Jose, CA (US); Christopher R. Palmer, Pittsburgh, PA (US); Jerome M. Pesenti, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 14/887,720

(22) Filed: Oct. 20, 2015

(65) Prior Publication Data
US 2017/0109401 A1    Apr. 20, 2017

(51) Int. Cl.
*G06F 16/24* (2019.01)
*G06F 16/242* (2019.01)
*G06F 16/2457* (2019.01)

(52) U.S. Cl.
CPC ...... *G06F 16/243* (2019.01); *G06F 16/24575* (2019.01)

(58) Field of Classification Search
CPC .......... G06F 17/3043; G06F 16/24522; G06F 16/24569–24578
See application file for complete search history.

(56) References Cited

U.S. PATENT DOCUMENTS

| | | | |
|---|---|---|---|
| 6,598,039 B1 * | 7/2003 | Livowsky | G06F 17/3043 |
| 7,398,209 B2 | 7/2008 | Kennewick et al. | |
| 7,412,402 B2 | 8/2008 | Cooper | |
| 7,720,674 B2 | 5/2010 | Kaiser et al. | |
| 8,458,153 B2 | 6/2013 | Pierce | |
| 2007/0150342 A1 * | 6/2007 | Law | G06Q 30/02 705/14.52 |
| 2011/0314029 A1 * | 12/2011 | Fischer | G06F 17/30516 707/748 |
| 2013/0041921 A1 | 2/2013 | Cooper et al. | |
| 2013/0198159 A1 * | 8/2013 | Hendry | G06F 17/3087 707/706 |

OTHER PUBLICATIONS

Li et al., "Constructing a Generic Natural Language Interface for an XML Database," Advances in Database Technology—EDBT 2006, 10th International Conference on Extending Database Technology (EDBT), Munich, Germany, Mar. 26-31, 2006, © 2006, pp. 1-18.

(Continued)

*Primary Examiner* — Robert W Beausoliel, Jr.
*Assistant Examiner* — Nirav K Khakhar
(74) *Attorney, Agent, or Firm* — Richard A. Wilhelm (57) ABSTRACT

Embodiments of the present invention disclose a method, computer program product, and system for searching a database using a user entered search query. A search query for a database is received by the computer and the computer applies condition-action rules based on natural language processing rules to identify one or more phrases within the search query that is associated an entity identifier. The computer further identifies any taxonomy variants that have been established for the identified phrases. The computer creates a search string that includes search query and the entity identifiers. The database search is conducted by the computer and the results are displayed for the user.

9 Claims, 7 Drawing Sheets

(56) References Cited

OTHER PUBLICATIONS

Nihalani et al., "Natural language Interface for Database: A Brief Review," IJCSI International Journal of Computer Science Issues, vol. 8, Issue 2, Mar. 2011, pp. 600-608.

Androutsopoulos et al., "Natural Language Interfaces to Databases—An Introduction," Journal of Natural Language Engineering, vol. 1, Mar. 16, 1995, pp. 1-50.

Popescu et al., "Towards a Theory of Natural Language Interfaces to Databases," Proceedings of the 8th International Conference on Intelligent user interfaces, IUI '03, Miami, Florida, USA, © 2003 ACM, pp. 1-9.

Tang et al., "Using Multiple Clause Constructors in Inductive Logic Programming for Semantic Parsing," Proceedings of the 12th European Conference on Machine Learning, Freiburg, Germany, Sep. 2001, pp. 466-477.

Tata et al., "SQAK: Doing More with Keywords," Proceedings of the 2008 ACM SIGMOD International conference on Management of data, Jun. 9-12, 2008, Vancouver, BC, Canada, © 2008 ACM, pp. 889-901.

Golenberg et al., "Keyword Proximity Search in Complex Data Graphs," Proceedings of the 2008 ACM SIGMOD International conference on Management of data, Jun. 9-12, 2008, Vancouver, BC, Canada, © 2008 ACM, pp. 1-14.

Kimelfeld et al., "Finding and Approximating Top-k Answers in Keyword Proximity Search," Proceedings of the Twenty-Fifth ACM SIGMOD-SIGACT-SIGART Symposium on Principles of Database Systems, Jun. 26-28, 2006, © 2006 ACM, pp. 1-10.

Kimelfeld et al., "Extracting Minimum-Weight Tree Patterns from a Schema with Neighborhood Constraints," EDBT/ICDT '13, Proceedings of the 16th International Conference on Database Theory, Mar. 18-22, 2013, Genoa, Italy, © 2013 ACM, pp. 1-12.

Hristidis et al., "Discover: Keyword Search in Relational Databases," VLDB '02, Proceedings of the 28th International Conference on Very Large Data Bases, Hong Kong, China, 2002, pp. 1-12.

Aditya et al., "BANKS: Browsing and Keyword Searching in Relational Databases," Proceedings of the 28th International Conference on Very Large Data Bases (VLDB), Hong Kong, China, 2002, pp. 1-4.

Pound et al., "Interpreting Keyword Queries over Web Knowledge Bases," CIKM '12, Proceedings of the 21st ACM International Conference on Information and Knowledge Management, Oct. 29-Nov. 2, 2012, Maui, HI, USA, © 2012 ACM, pp. 1-10.

Mell et al., "The NIST Definition of Cloud Computing," National Institute of Standards and Technology, U.S. Department of Commerce, Special Publication 800-145, Sep. 2011, pp. 1-7.

\* cited by examiner

DOMAIN CENTRIC NATURAL LANGUAGE QUERY ANSWERING

BACKGROUND

The present invention relates generally to the field of using natural language analysis of a query to retrieve specific data contained within a database, and more particularly to using an internal schema to assignee specific entity tags to the phrases contained within the query.

The size of databases have grown with the amount of data that corporations would like to store. For example, retail databases contain information about each product, distribution needs, delivery dates of products, sales of products across the company, sales of products at each location, total sales of each location, sales of each employee, and other data that might be relevant. As the amount of data contained within retail databases increases, query searching takes more time.

BRIEF SUMMARY

Additional aspects and/or advantages will be set forth in part in the description which follows and, in part, will be apparent from the description, or may be learned by practice of the invention.

Embodiments of the present invention disclose a method, computer program product, and system for searching a database using a user entered search query. A search query for a database is received by the computer and the computer applies condition-action rules based on natural language processing rules to identify one or more phrases within the search query that is associated an entity identifier. The computer creates a search string that includes search query and the entity identifiers. The database search is conducted by the computer and the results are displayed for the user.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Reference will now be made in detail to the embodiments of the present invention, examples of which are illustrated in the accompanying drawings, wherein like reference numerals refer to like elements throughout.

Embodiments of the invention are general directed to a system for natural language processing of a database query. In an exemplary embodiment, a user enters a query into a graphical user interface. The application analyzes the query using rules to apply an internal schema to the language contained within the query to form the database search string. The application searches the databases using the search string that was created when the internal schema was applied to query. By applying the internal schema to the query language, and by using the internal schema to help create the search string allows for quick access to the desired data contain within the database.

Figure 1:
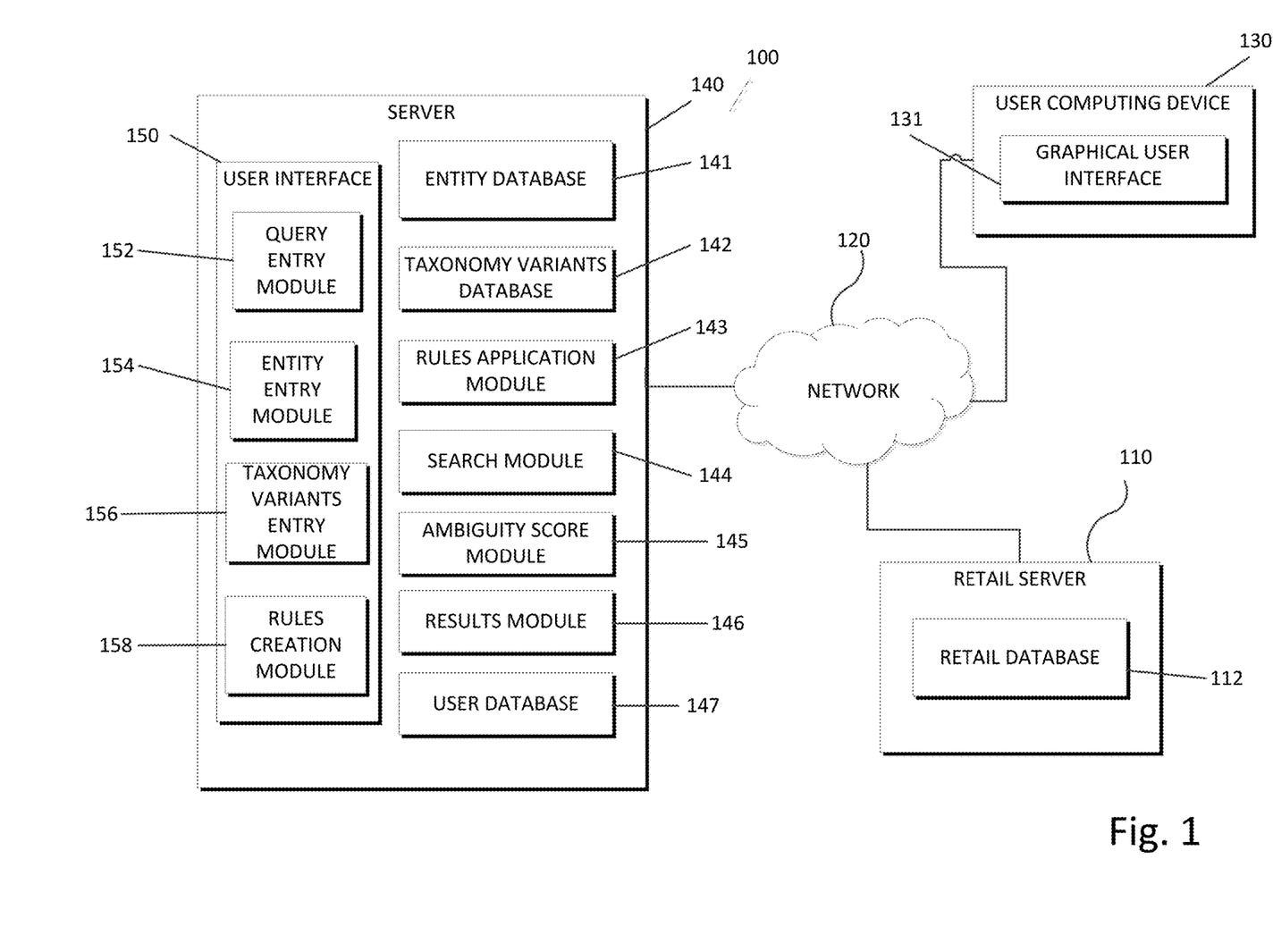
FIG. 1 is a functional block diagram illustrating domain-centric natural language query answering processing environment, in accordance with an embodiment of the present invention.

FIG. 1 is a functional block diagram illustrating domain-centric natural language query answering processing environment 100, in accordance with an embodiment of the present invention. Domain-centric natural language query answering processing environment 100 may include a retail server 110, user computing device 130 and server 140, all interconnected over network 120.

Network 120 can be, for example, a local area network (LAN), a wide area network (WAN) such as the Internet, or a combination of the two, and can include wired, wireless, or fiber optic connections. In general, network 120 can be any combination of connections and protocols that will support communications between the user computing device 130, server 140, and retail server 110, in accordance with one or more embodiments of the invention.

Figure 6:
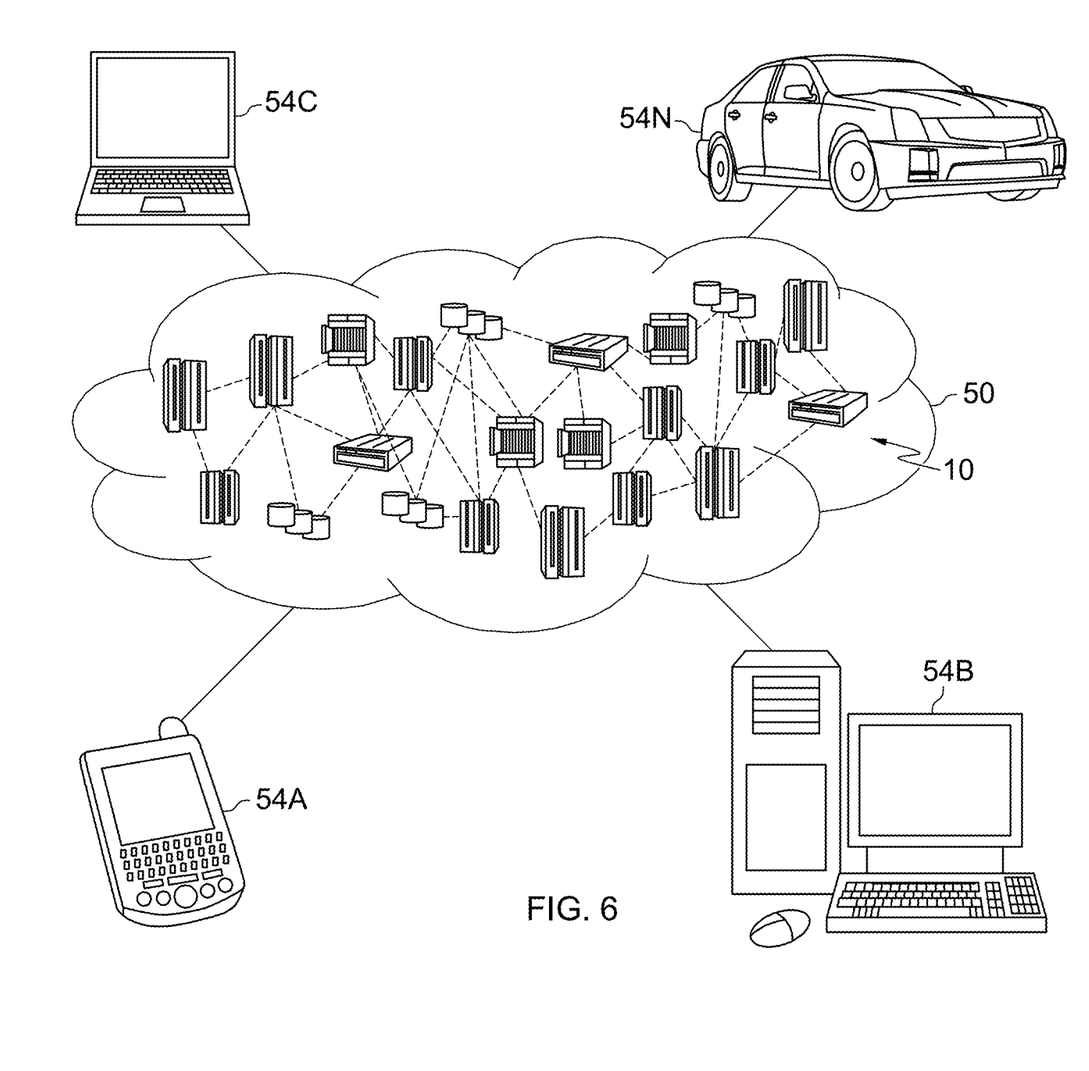
FIG. 6 depicts a cloud computing environment according to an embodiment of the present invention.
Figure 7:
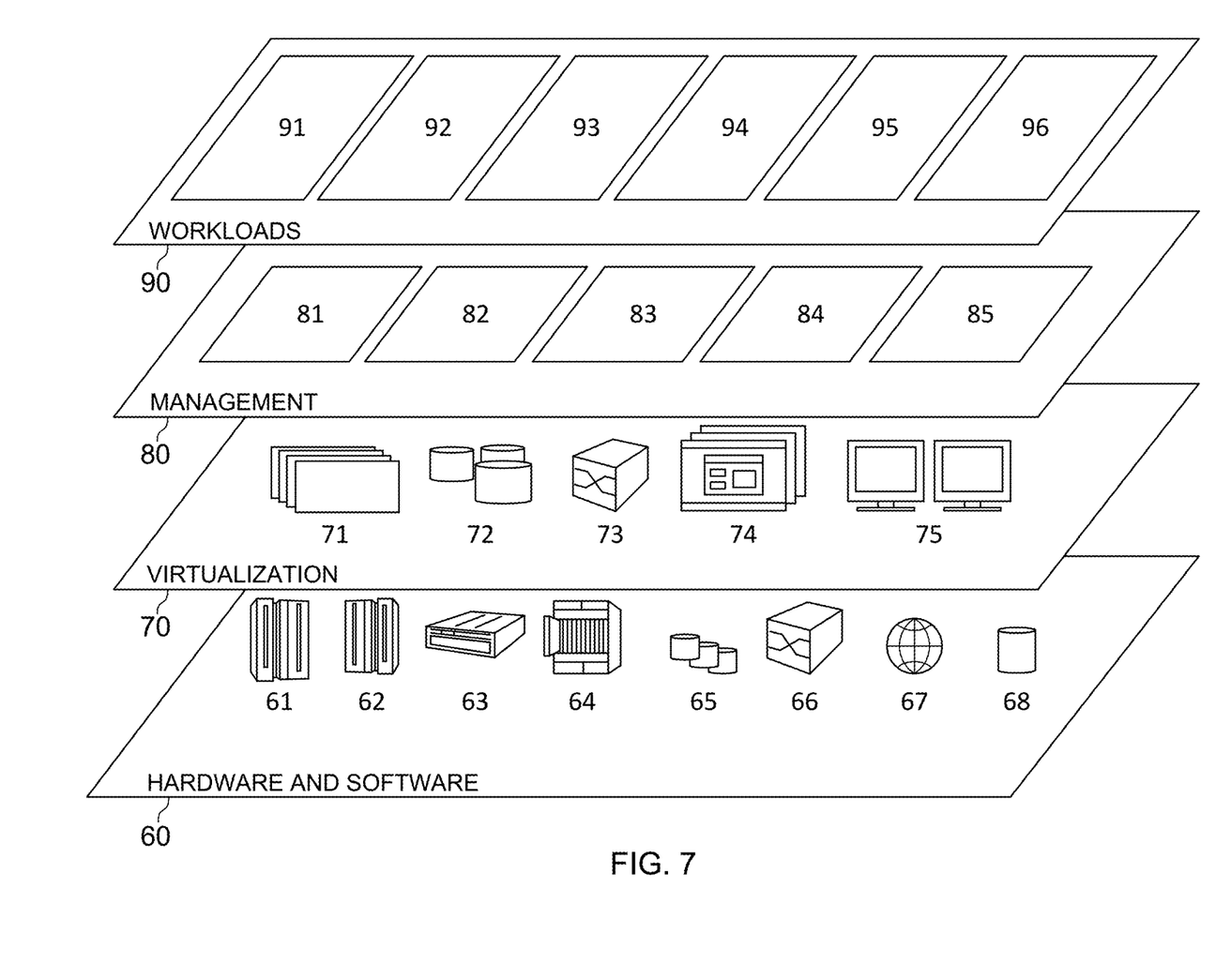
FIG. 7 depicts abstraction model layers according to an embodiment of the present invention.

The retail server 110 contains a retail database 112 that stores the retail data in accordance with an internal schema. Retail database 112 can store data about each product, distribution needs, delivery dates of products, sales of products across the company, sales of products at each location, total sales of each location, sales by each employee, and any other data that might be relevant. The retail server 110 and retail database 112 represent exemplary databases that can be used, in accordance with one or more embodiments of the invention. One of ordinary skill in the art would realize that databases containing any data in accordance with a schema can be used in the practice of this invention, not only a database of retail information. In other embodiments, retail server 110 may include internal and external hardware components, as depicted and described in further detail below with respect to FIG. 6, and operate in a cloud computing environment, as depicted in FIGS. 7 and 8.

A user computing device 130 represents a computing device that hosts a graphical user interface (GUI) that allows a user to communicate with server 140, and retail server 110. User computing device 130 may include GUI 131, which represents one or more user interfaces for sending and receiving information between user computing device 130, server 140, and retail server 110. GUI 131 may be, for example, a web browser, an application, or other types of GUIs for communication between user computing device 130, server 140, and retail server 110 via the network 120. GUI 131 allows for the user to access a user interface 150 on server 140. The user interface 150 includes a query entry module 152, entity entry module 154, taxonomy variants entry module 156, and rules creation module 158. Based on which user is accessing the GUI 131, the user, if authorized, may further have access to an entity entry module 154, taxonomy variants entry module 156, and a rules creation module 158.

The user computing device 130 may be any type of computing device that is capable of connecting to network 120, for example, a laptop computer, tablet computer, netbook computer, personal computer (PC), a desktop computer, a smart phone, or any programmable electronic device supporting the functionality required by one or more embodiments of the invention. The user computing device 130 may include internal and external hardware components, as depicted and described in further detail below with respect to FIG. 5. In other embodiments, user computing device 130 may operate in a cloud computing environment, as depicted in FIGS. 6 and 7.

Server 140 represents one or more network platforms that host one or more query analysis and query search applications which receive and process the user's query. Server 140 may include an entity database 141, a taxonomy variants database 142, rules application module 143, a search module 144, an ambiguity score module 145, a results module 146, a user interface 150. Server 140 may include internal and external hardware components, as depicted and described in further detail below with reference to FIG. 5. In other embodiments, server 140 may operate in a cloud computing environment, as depicted in FIGS. 6 and 7.

The entity database 141 is a data store that maintains the internal scheme that is set by a user, who has the proper authorization, and the user is able to add or remove stored entities by using the entity entry module 154 on the user interface 150. The internal scheme or entities established by the user can mirror the business model for a company, the types of items provided, the type of services that are provided, and any type of identifiers that can be applied to data contained within the retail database or any combination thereof. For example, possible entity identifiers can be product, time interval (for example, a time frame to conduct the search), brand, type of service, location, and categories. The above entities are provided as examples only and are not intended to be limiting to the scope of the application.

The taxonomy variants database 142 is a data store that contains terminology variants for the taxonomy terms that have been entered into retail database 112. The taxonomy variants database 142 further indicates some of the terminology which might be a variant of a term. For example, the term "GUITAR HERO" could have multiple variants, such as, "GH," "GUITAR HERO 1," "GH 1," "GUITAR HERO 2," or "GH 2." The retail database 112 might store data under any of the taxonomy variants, thus if the search is not conducted using the proper taxonomy variants it can lead to faulty search results. The search module 144, as described below, may conduct a search using a search string which identifies the different taxonomy variants identified in the taxonomy variants database 142. An authorized user is able to add or remove taxonomy variants in the taxonomy variants database 142 by using the taxonomy variant entry module 156 on the user interface 150. The above taxonomy variants are provided as examples only and are not intended to be limiting to the scope of the application.

Figure 2:
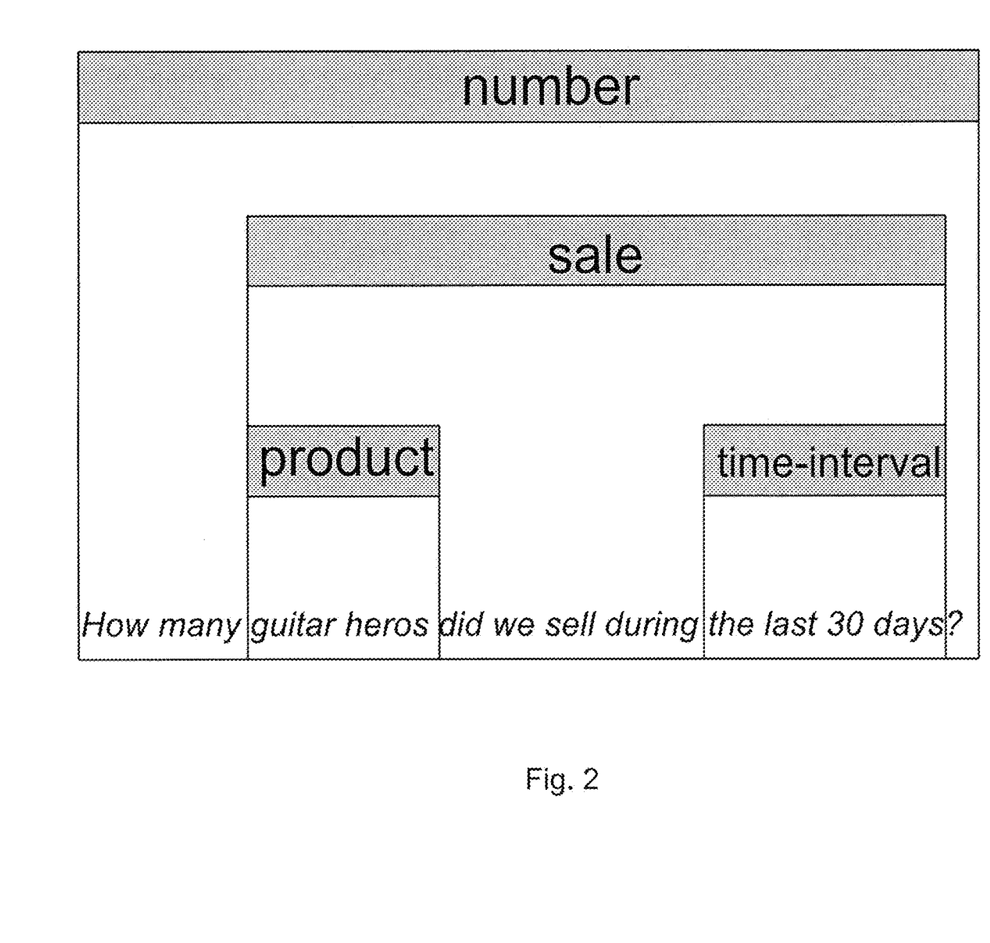
FIGS. 2 and 3 are examples of exemplary query analysis rules being applied to a query search within the data processing environment of FIG. 1, in accordance with an embodiment of the present invention.
Figure 3:
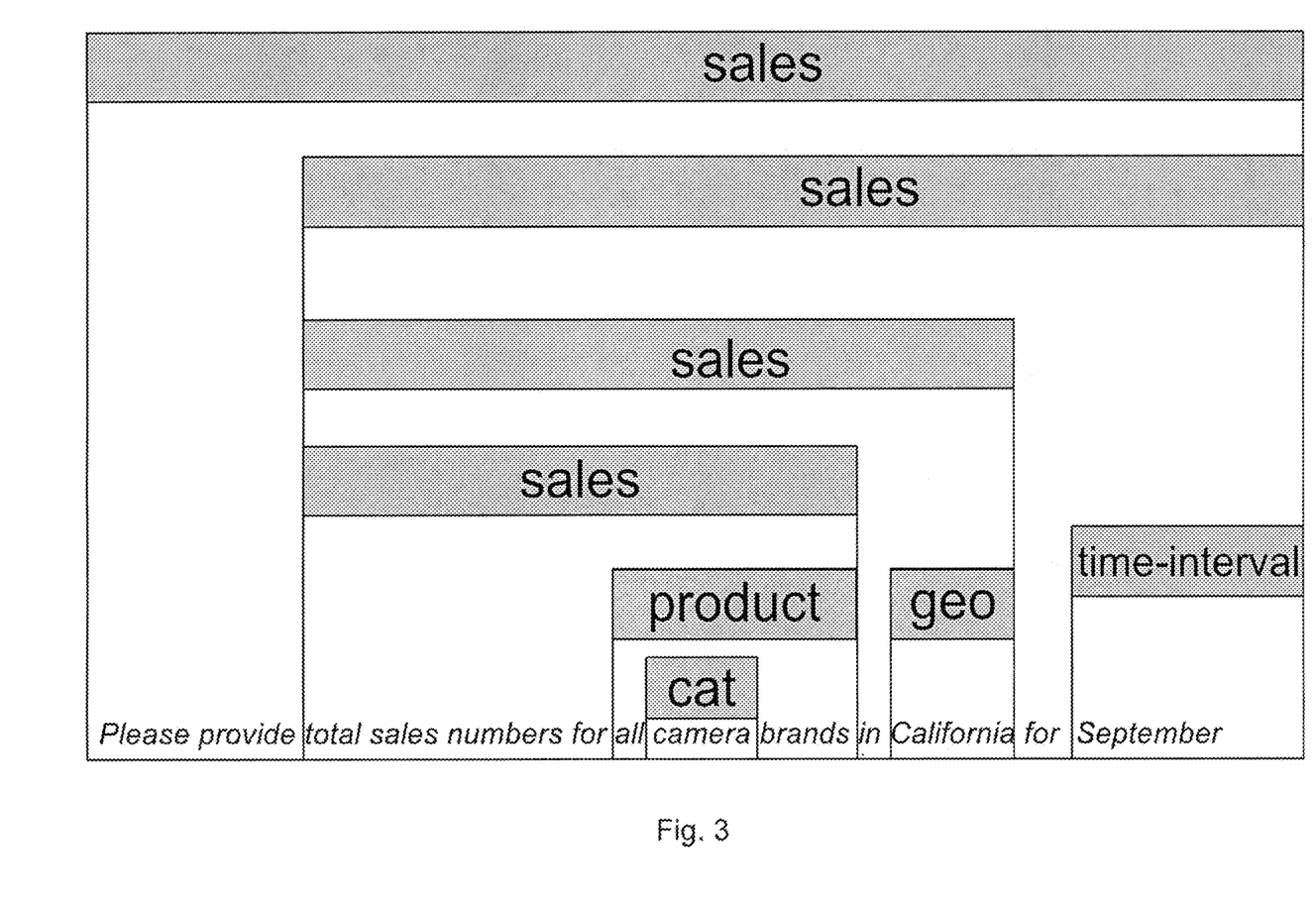

The rules application module 143 applies condition-action rules based on natural language processing rules to the user entered query to create a search string for the search module 144. FIGS. 2 and 3 are examples of a user entered search query with exemplary rules being applied to them to identify the entities in the query in order to create the search string. An exemplary rule set that the rules application module 143 can apply is breaking up the query into individual phrases and moves along the query from left to right to see if an entity identifier from the entity database 141 can be associated with each of the individual phrases, when creating the search string. The rules application module 143 may further take any phrase that has had an entity identifier associated with it and searches for the phrase within the taxonomy variants database 142 to determine if the database contains any taxonomy variants for the phrase. The rules application module 143 may apply the rules to the individual phrases, then reapply the rule to the query while increasing the size of the small phrases. For example, the small phrase can increase from one word to two words. The rules application module 143 keeps reapplying the rules until the phrase encompasses the entire search query. The above example of a rule is used only as an exemplary rule that the rules application module 143 could apply to the search query and is not intended to be limiting to the scope of the application. An authorized user is able to add or remove rules to be applied by the rules application module 143 by using the rules creation module 158 on the user interface 150.

FIG. 2 shows an example of exemplary query analysis rules being applied to a query search within the data processing environment of FIG. 1, in accordance with an embodiment of the present invention. FIG. 2 shows the example search query "How many guitar heroes did we sell during the last 30 days?" The rules application module 143 breaks up the query into small phrases composed of a singular word. In the first application of the rules, the rules application module 143 breaks the query into one term phrases and determines if an entity identifier needs to be associated with the phrase. In the example query of FIG. 2, the rules application module 143 does not identify any phrases that have a corresponding entity identifier in the first application of the rule, so the rule is reapplied by the rules application module 143, but increases the size of the phrase by one word. The rules application module 143 checks each of the phrases to determine if an entity identifier should be associated with each phrase within the query. The rules application module 143 checks the phrases "How many," "many guitar," and the phrase "guitar hero" and the rules application module 143 determines that the entity identifier "product" from the entity database 141 can be associated with the phrase "guitar hero." The rules application module 143 starts to create the search string when phrases are being identified and uses the associated entity identifiers and the phrases when creating the search string. The rules application module 143, further determines if the phrase has any variants in the taxonomy variants database 142. The rules application module 143 reapplies the rules to the search query and each time the rules application module 143 reapplies the rule, the size of the phrase increases. For example, if the rules is being applied for the third time, the phrase size is three words and when the rules are applied for a fourth time then the phrase size will be four words. Each time the rules application module 143 reapplies the rules it increases the size, i.e. the number of words, of the phrase that are considered when determining if an entity identifier should be associated with each phrase. The rules application module 143 further applies the "time-interval," "sale," and "number" entity identifiers to phrases in the search query. Each time the rules application module 143 applies an entity identifier to a phrase, the rules application module 143 further determines if that phrase is listed within the taxonomy variants database 142 and determines if that phrase has any known taxonomy variants associated with the phrase in the taxonomy variants database 142. The rules application module 143 creates the search string comprising searching "number of sales in the time interval of 30 days of product GUITAR HERO (known variants: GUITAR HERO 1, GH1, GUITAR HERO 2, GH2)" for the search module 144 to conduct the search of the retail database 112. The search string further contains information for the known taxonomy variants listed in the taxonomy variants database 142 associated with the phrase of the search string.

As illustrated in FIG. 3, the received search query is "Please provide total sales numbers for all camera brands in California for September?" The rules application module 143 breaks up the query into small phrases composed of a singular word. In the first application of the rules, the rules application module 143 breaks the query into one term phrases and determines if an entity identifier can be associated with the phrase. As illustrated by FIG. 3, the rules application module 143 breaks up the query into singular phrases and identifies the phrases "camera," "California," and "September." The rules application module 143 associates the entity identifiers "category," "geographical location," and "time-interval" to each of the phrases, respectively in the search string. Each time the rules application module 143 applies an entity identifier to a phrase, the rules applications module 143 further determines if that phrase has any known taxonomy variants stored within the taxonomy variants database 142. As illustrated by FIG. 3, no entities were identified during the second application of the rule, i.e., the phrase is composed of two words, so the rule is reapplied by the rules application module 143, but increases the size of the phrase to three words. The rules application module 143 identifies the key phrase "all camera brands" and applies the entity identifier "product" from the entity database 141. The rules application module 143, further determines if the key phrase has any listed known variants in the taxonomy variants database 142.

The rules application module 143 reapplies the rules multiple times, increasing the size of the phrase each time as illustrated by the example in FIG. 3. The rules application module 143 further applies the "sale" entity identifier multiple times as the rule is reapplied to the search query. The entity identifier "sale" is applied to the phrase "total sales number for all camera brands" because the rules application modules 143 identifies the subject matter of the phrase is "sales," thus, the rules application module 143 applies the entity identifier "sales" to that phrase. The rules application module 143 increases the size, i.e. the number of words, of the phrase and reapplies the entity identifier "sales" to the phrase during different applications of the rules. The rules application module 143 creates the search string comprising searching "sales of all camera brands (listed all variants for the key phrase) in California in September" for the search module 144 to conduct the search of the retail database 112.

Returning to FIG. 1, server 140 further includes search module 144 which receives the search string created by the rules application module 143 and connects via the network 120 to the retail server 110 to gain access to the retail database 112. The search module 144 conducts the search of the retail database 112 to retrieve relevant data using the search string created by the rules application module 143.

Ambiguity score module 145 determines if there is an ambiguity with the search result data, search string and/or the user. The ambiguity score module 145 determines that an ambiguity is present when multiple search results are returned, an error might be in the search string, or the query is not clear as to what information it is seeking. For example, ambiguity can be created in the result data when the result data is not desired data requested by the query. For example, the query can use the phrase "LEGO NINJAGO," and this phrase could be used in reference to different products, such as, toys, video games, books, clothing, and movies. Therefore, the result data could in part reference all of these categories, some of the categories, or a single category, thus, creating possible confusion in the result data. The ambiguity score module 145 scores or ranks the possible result data results and determines which of the results data that appears to answer the search query based off the given score. For example, the ambiguity score module 145 takes in to account who the user is, for example, his position within the company, department he is working for, is the user authorized to receive the information, the user query history (i.e., is he concerned with a specific data area) or any other user statistical data by accessing the information contained in the user database 147, which will be explained below, to score the result data and to recommended which the result data to display based off the score for the result data. The ambiguity score module 145 might, for example, further take into account the natural language processing rules the rules application module 143 used in the analysis of the query, i.e. if the rule was newly written, and any other data about the rules that might be relevant to the ambiguity score module 145 to recommend which result data to display. The ambiguity score module 145 is further able to track the different types of queries received to determine if there is a trend in the type of queries. The ambiguity score module 145 uses the different scoring method, as described above, to score the results data and recommends which result data that the results module 146 should display. The results module 146 displays or transmits the result data to the user.

The user database 147 is a data store that stores information about the user who entered the database search query. The user database 147 stores a user profile that can contain information about the user, for example, his position within the company, department he is working for, is the user authorized to receive the information, the user query history (i.e., is he concerned with a specific data area) or any other user statistical data.

Figure 4:
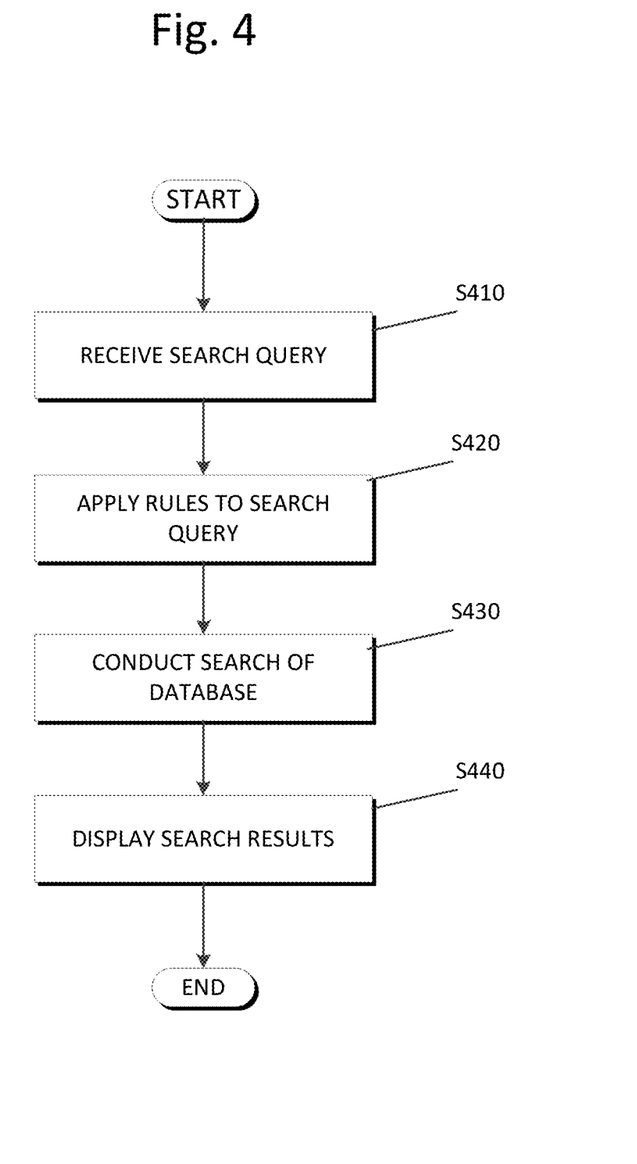
FIG. 4 is a flow chart for conducting a query search, in accordance with an embodiment of the present invention.

FIG. 4 is a flow chart for conducting a query search, in accordance with an embodiment of the present invention.

Server 140 receives the query that a user entered in the GUI 131 of the user computing device 130 (S410). The rules application module 143 applies the natural language processing rules to the query and applies the necessary entity identifiers and taxonomy variants needed to create the search string (S420). The search module 144 conducts the search using the search string created by the rules application module 143 and the ambiguity score module 145 scores the search results (S430). The results module 146 of server 140 transmits or displays the search results to the user (S440).

Figure 5:
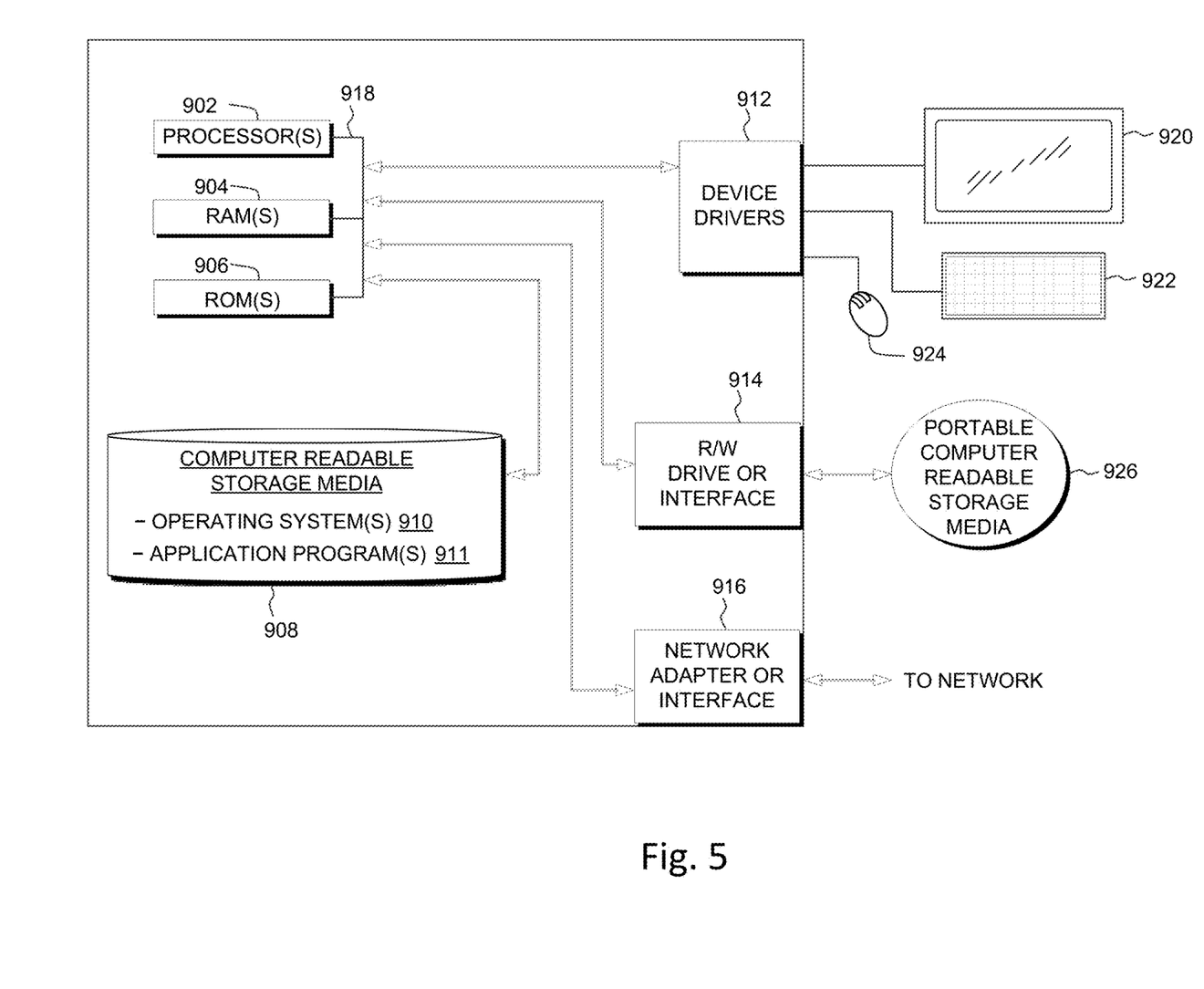
FIG. 5 is a functional block diagram illustrating a data processing environment, in accordance with an embodiment of the present invention.

FIG. 5 depicts a block diagram of components of computing device 106 of domain-centric natural language query answering processing environment 100 of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

User computing device 130, retail server 110 and/or server 140 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, user interface 150 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

User computing device 130, retail server 110 and/or server 140 may also include a R/W drive or interface 914 to read from and write to one or more portable computer readable storage media 926. Application programs 928 on client computing devices and/or server 140 may be stored on one or more of the portable computer readable storage media 926, read via the respective R/W drive or interface 914 and loaded into the respective computer readable storage media 908.

User computing device 130, retail server 110 and/or server 140 may also include a network adapter or interface 916, such as a TCP/IP adapter card or wireless communication adapter (such as a 4G wireless communication adapter using OFDMA technology). Application programs 911 on user computing device 130 and/or server 140 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

User computing device 130, retail server 110 and/or server 140 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 6, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA. Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and domain-centric natural language query answering processing environment 96.

Based on the foregoing, a computer system, method, and computer program product have been disclosed. However, numerous modifications and substitutions can be made without deviating from the scope of the present invention. Therefore, the present invention has been disclosed by way of example and not limitation.

While the invention has been shown and described with reference to certain exemplary embodiments thereof, it will be understood by those skilled in the art that various changes in form and details may be made therein without departing from the spirit and scope of the present invention as defined by the appended claims and their equivalents.

What is claimed is:

1. A method for searching a database using a user entered search query, the method comprising:
   receiving, by a computer, a user entered search query;
   identifying, by a computer, one or more phrases in the search query;
   comparing, by the computer, the one or more phrases to an entity identifier database to determine whether the one or more phrases are associated with one or more entity identifiers in the entity identifier database by applying condition-action rules based on performing natural language processing (NLP) rules to the search query;
   identifying, by the computer, taxonomy variants for the one or more phrases;
   creating, by a computer, a search string that includes the search query, the associated entity identifiers, and the identified taxonomy variants;
   searching, by the computer, a database using the created search string;
   ranking the database search results in order to determine which database search result to display when multiple different search results have been returned when conducting the database search, wherein the ranking of the database search results is based on two or more of: a department the user works for, a position of the user, user statistics; and displaying, by the computer, the database search results.

2. The method of claim 1, wherein the entity database is an internal schema that is applied to data contained within the database.

3. The method of claim 1, wherein the ranking of the database search results comprises determining, by the computer, if there is a statistical trend in a subject matter for the query and ranking the multiple different search results to reflect the statistical trend of the subject matter.

4. A computer program product for searching a database using a user entered search query, the computer program product comprising:

one or more non-transitory computer-readable storage media and program instructions stored on the one or more non-transitory computer-readable storage media, the program instructions comprising:

receiving a user entered search query;

identifying one or more phrases in the search query;

comparing, by the computer, the one or more phrases to an entity identifier database to determine whether the one or more phrases are associated with one or more entity identifiers in the entity identifier database by applying condition-action rules based on performing natural language processing (NLP) rules to the search query;

identifying, by the computer, taxonomy variants for the one or more phrases;

creating a search string that includes the search query, the associated entity identifiers, and the identified taxonomy variants;

searching a database using the created search string;

ranking the database search results in order to determine which database search result to display when multiple different search results have been returned when conducting the database search, wherein the ranking of the database search results is based on two or more of: a department the user works for, a position of the user, user statistics; and displaying the database search results.

5. The computer program product of claim 4, wherein the entity database is an internal schema that is applied to data contained within the database.

6. The computer program product of claim 4, wherein the ranking of the database search results comprises determining, by the computer, if there is a statistical trend in a subject matter for the query and ranking the multiple different search results to reflect the statistical trend of the subject matter.

7. A computer system for searching a database using a user entered search query the computer system comprising:

one or more computer processors, one or more computer-readable storage media, and program instructions stored on one or more of the computer-readable storage media for execution by at least one of the one or more processors, the program instructions comprising:

receiving a user entered search query;

identifying one or more phrases in the search query;

comparing, by the computer, the one or more phrases to an entity identifier database to determine whether the one or more phrases are associated with one or more entity identifiers in the entity identifier database by applying condition-action rules based on performing natural language processing (NLP) rules to the search query;

identifying, by the computer, taxonomy variants for the one or more phrases;

creating a search string that includes the search query, the associated entity identifiers, and the identified taxonomy variants;

searching a database using the created search string;

ranking the database search results in order to determine which database search result to display when multiple different search results have been returned when conducting the database search, wherein the ranking of the database search results is based on two or more of: a department the user works for, a position of the user, user statistics; and displaying the database search results.

8. The computer system of claim 7, wherein the entity database is an internal schema that is applied to data contained within the database.

9. The computer system of claim 7, wherein the ranking of the database search results comprises determining, by the computer, if there is a statistical trend in a subject matter for the query and ranking the multiple different search results to reflect the statistical trend of the subject matter.

* * * * *